US008201241B2

United States Patent
Tian et al.

(10) Patent No.: US 8,201,241 B2
(45) Date of Patent: Jun. 12, 2012

(54) METHOD AND SYSTEM FOR PUBLISHING PRESENCE INFORMATION (75) Inventors: Linyi Tian, Shenzhen (CN); Yang Zhao, Shenzhen (CN); Qian Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 886 days.

(21) Appl. No.: 11/936,918

(22) Filed: Nov. 8, 2007

(65) Prior Publication Data

US 2008/0092233 A1    Apr. 17, 2008

Related U.S. Application Data (63) Continuation of application No. PCT/CN2006/002519, filed on Sep. 25, 2006.

(30) Foreign Application Priority Data

Sep. 30, 2006  (CN) .......................... 2005 1 0112504

(51) Int. Cl.
    G06F 7/04    (2006.01)
(52) U.S. Cl. .................... 726/18; 726/6; 726/7; 726/17; 726/19; 713/155; 713/168
(58) Field of Classification Search .................. 713/155, 713/168, 201; 709/223; 726/17, 6, 7, 18, 726/19
    See application file for complete search history.

(56) References Cited

U.S. PATENT DOCUMENTS

| 2003/0023623 A1 | 1/2003 | Horvitz et al. |
| 2003/0229687 A1 | 12/2003 | Ohno et al. |
| 2004/0193920 A1 | 9/2004 | Kiss et al. |
| 2005/0102389 A1 | 5/2005 | Liscano et al. |
| 2006/0031293 A1* | 2/2006 | Thommes et al. ............ 709/204 |

FOREIGN PATENT DOCUMENTS

| CN | 1625737 A | 6/2005 |
| WO | WO-2004/021730 A1 | 3/2004 |
| WO | WO 2004/034719 A1 | 4/2004 |
| WO | WO 2007/126272 A1 | 11/2007 |

OTHER PUBLICATIONS

English Translation of Written Opinion of the International Searching Authority in PCT Applicaton No. PCT/CN2006/002519, dated Feb. 1, 2007.
European Communication pursuant to Article 94(3) EPC for Application No. 06 791 108.1-1244, dated Nov. 30, 2009.

(Continued)

*Primary Examiner* — Eleni Shiferaw
*Assistant Examiner* — Paul Callahan
(74) *Attorney, Agent, or Firm* — Finnegan, Henderson, Farabow, Garrett & Dunner LLP (57) ABSTRACT

This invention relates to a method for publishing presence information, including: receiving, by a presence server, a message carrying presence information to be published sent from a delegated presentity client or application server; publishing the presence information in the message carrying presence information to be published according to delegation authorization rules upon determining that the presence information is published by delegation; sending the processed presence information to a watcher client. This invention also provides, a presence server and a presence information composing and publishing unit for publishing presence information. The invention makes it more flexible to publish presence information and enhances user' experience.

8 Claims, 8 Drawing Sheets

OTHER PUBLICATIONS

Chinese Office Action in related Chinese Patent Application No. 200510112504.3, dated Dec. 11, 2009, with partial English Translation.

Chinese Office Action in related Chinese Patent Application No. 200510112504.3, dated Dec. 21, 2007, with partial English Translation.

Open Mobile Alliance, Presence SIMPLE Specification, OMA-TS-PRESENCE_SIMPLE-V1_0-20050628-C, Candidate Version 1.0-28, Jun. 2005, pp. 1-100.

Extended European Search Report for European Application No. 06791108.1 including supplementary European search report and European search opinion, Oct. 14, 2008.

* cited by examiner

METHOD AND SYSTEM FOR PUBLISHING PRESENCE INFORMATION

The present application is a continuation of PCT application PCT/CN2006/002519, filed on Sep. 25, 2006, entitled "A METHOD AND SYSTEM OF ISSUING THE PRESENCE INFORMATION", which is incorporated by reference herein in its entirety.

FIELD OF THE INVENTION

This invention relates to a method and system for publishing presence information, in particular to a method and system for publishing presence information via delegation.

BACKGROUND OF THE INVENTION

At present, presence service, a communication service used to collect and publish presence information, is more and more widely used. Many people, including family members, friends, and strangers, may want to obtain presence information of people who use the presence service. Much of the presence information, however, is user's privacy. The presence service enables a user to search for chat partners and query the status of partners through various terminals, without being restricted by time and space. As a result, instant information exchange according to text and multimedia may be achieved. A presence server is used to present and manage the user status. According to presence information, a user may know information including whether another partner is online, what the partner is doing (for example, having a meeting or dinner), client capability, and so on. The user may send a request to other user to share media contents such as ring tone, picture and file.

Figure 1:
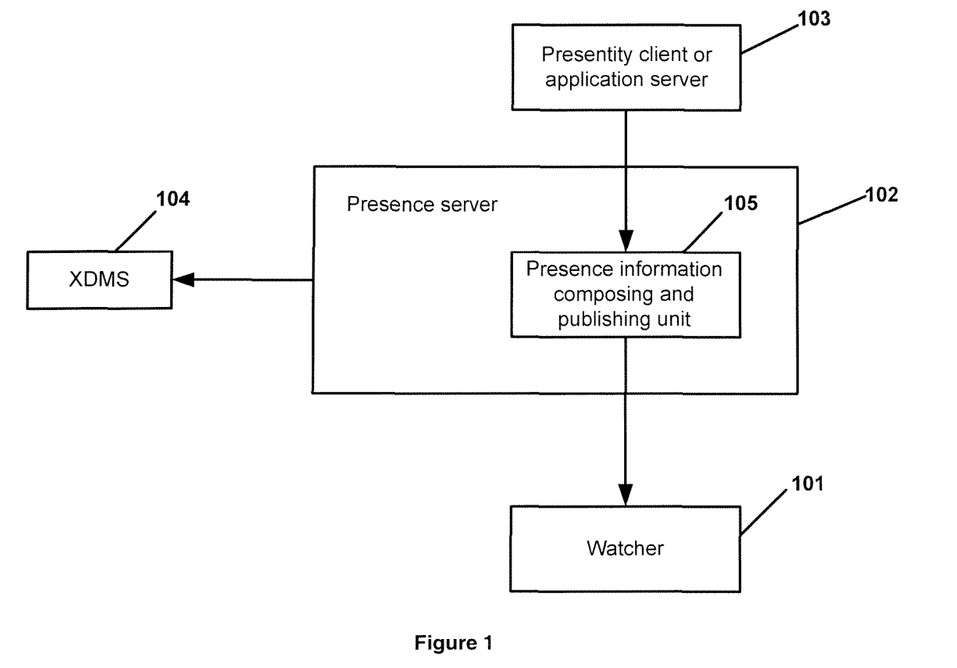
FIG. 1 is a schematic diagram of a system for presenting service in prior arts.

FIG. 1 shows a schematic diagram of the system for providing presence service in prior arts. The system comprises the presentity client or the application server (103), presence server (102), watcher client (101), and presence XML document management system (XDMS) (104). The presentity client or the application server (103) is the source of presence information. When the presence information changes, the presentity client or the application server (103) sends a PUBLISH message to the presence server (102) to publish the present information.

The presentity client and the watcher client (101) may be mobile terminals such as mobile phone or personal digital assistance (PDA), or intelligent terminals such as digital set top box (STB). The above functions of mobile terminals may also be used in fixed terminals. At present, fixed terminals with function of the session initiation protocol (SIP) emerge. An application program publishing messages is available in the presentity client or the application server (103). A user selects and confirms the information to be published, then the presentity client or the application server (103) sends the presence server (102) all the information including user ID.

The presence server (102) receives SUBSCRIBE messages from the watcher client (101) and judges subscription result according to subscription authorization rules preset by the presentity client. The presence server receives PUBLISH messages from the presentity client, processes the messages according to rules (including content composition, authorization and filter) preset by the presentity client or the application server (103), and publishes the presence information to the watcher client (101) by NOTIFY messages.

The watcher client (101) subscribes to presence information of the presentity client or the application server (103) and receives the NOTIFY messages from the presence server (102).

The presence XDMS (104) stores authorization rules (eg, subscription authorization rules, content authorization rules, delegation authorization rules, etc.) of the presentity client or the application server (103), group list, etc. Other units such as presence information composing and publishing unit may directly access the XDMS (104) via XML document configuration and access protocol (XCAP), or obtain a series of information (eg, subscription authorization rules, content authorization rules, delegation authorization rules, etc.) from the authorization rules in the XDMS (104) by a special information access unit. The presence XDMS (104) may be merged with the presence server (102) or be placed as an independent service units accessed via a specified communication protocol.

Figure 2:
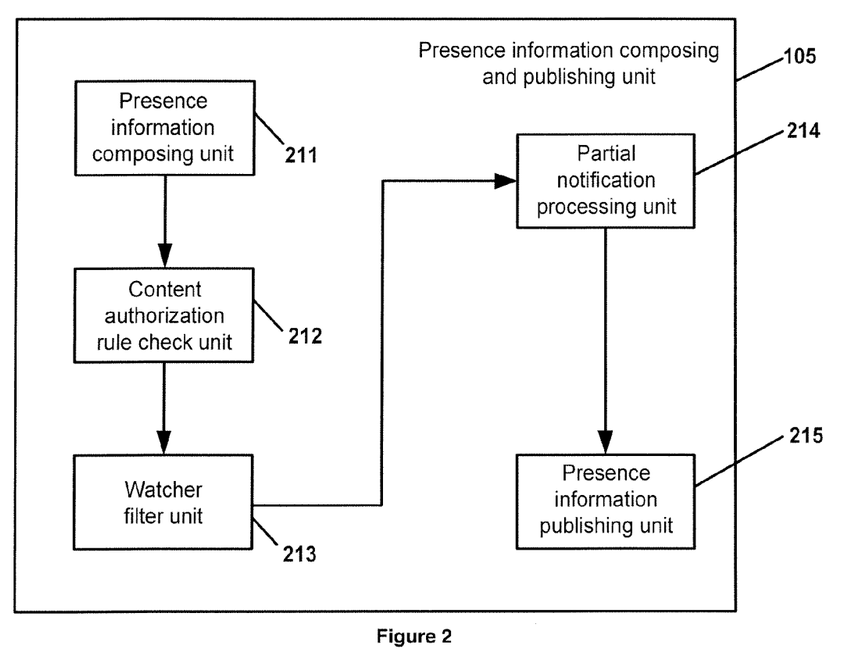
FIG. 2 is a schematic diagram of a unit for composing and publishing presence information in prior arts.

The above SUBSCRIBE and PUBLISH messages are SIP messages. In a SIP message, PUBLISH message header contains presentity ID, and PUBLISH message body contains an XML document, which is presence information of the presentity. A SUBSCRIBE or PUBLISH message is not limited to an SIP message. In the IP multimedia subsystem (IMS) network, it is an SIP message, in other networks such as ICQ/MSN application in the IP network, it may be a private message. The presence server (102) comprises a most important unit refer to as the presence information composing and publishing unit (105) and FIG. 2 shows its schematic diagram. The presence information composing and publishing unit (105) comprises presence information composing unit (211), content authorization rules checking unit (212), watcher filtering unit (213), partial notification processing unit (214), and presence information publishing unit (215). The presence information composing unit (211) composes newly published presence information and presence information saved in the presence server. The content authorization rules checking unit (212) filters information and rejects information not permitted to be published according to rules set by the presentity client. The watcher filtering unit (213) filters information and rejects information not expected to be received according to rules set by the watcher client; for example, the watcher only wishes to be informed when a user get online and expects to reject other presence information. The partial notification processing unit (214) filters information and rejects the information beyond the scope of subscription according to the rules set by the watcher (101) during subscription; for example, the watcher only wishes to be informed presence information relating to location. The presence information publishing unit (215) notifies the watcher client (101) of the processed presence information. The connection sequence of the content authorization rules checking unit, watcher filtering unit, and partial notification processing unit may be set according to actual conditions.

Figure 3:
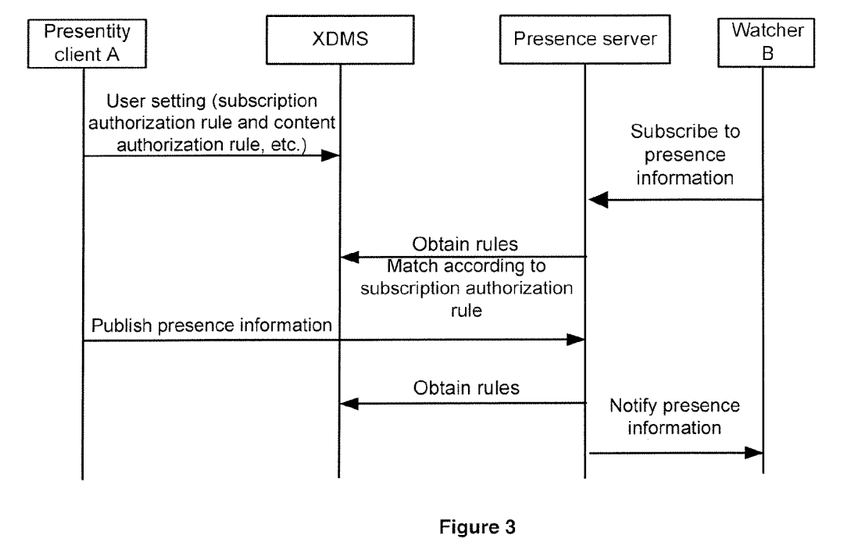
FIG. 3 is an flow chart in prior arts.

FIG. 3 shows the interactive flow chart of a prior system. The detail is as follows:

1) Presentity client A sets some rules such as subscription authorization rules and content authorization rules in XDMS. The presence server may obtain the rules via XCAP, or by notification of changing of the rules from the XDMS if the presence server subscribes the notification of changing of the rules. The subscription authorization rules and content authorization rules are saved in an XML file, which includes three major elements, that is, Condition, Action, and Transformation. Condition indicates the match condition, and Action indicates the match result (eg. permit, reject, friendlily reject, confirm, etc.). The two elements are combined to represent the subscription authorization rules and process subscription requests from the watcher client according to the subscription authorization rules set by the presentity client. Transformation represents the content authorization rules, filters information and rejects the information not permitted to be published according to the content authorization rules set by the presentity client.

2) Watcher client B sends a subscription request to the presence server to subscribe to presence information of the presentity client.

3) The presence server matches the subscription request according to the subscription authorization rules in the XDMS. if the subscription request satisfy the subscription authorization rules, the presence server permits watcher B's subscription and saves subscription relationship of watcher B and presentity A.

4) Presentity client A publishes presence information to the presence server.

5) The presence server sends NOTIFY message carrying the presence information to watcher B, after processing the presence information according to a series of rules.

In the aforesaid arts, the XDMS is separated from the presence server, and all rules are saved in the XDMS. The presentity client sets or modifies rules in the XDMS via XCAP by aggregation proxy, or the application server sets or modifies the rules directly via XCAP, or presence user set or modify the rules through man-machine interface such as Web page. In prior arts, the XDMS and the presence server may be merged, and all rules are saved in the presence server. In aforesaid arts, the publisher of presence information must be the presentity client, which is not flexible enough and provides poor user experience. The aforesaid publication of presence information is called non-delegation publication. If other persons or devices are delegated to publish presence information on behalf of the presentity, the aforesaid defect may be avoided. For example, when user A logs in to the game server to play games, his presence status is "playing game" and the presence information of user A may include the game server name, game hall name, game name, etc. The user A wishes that the game server may be delegated to publish presence information for him so that his friends may obtain his status and log in to the same game server to play games with him. In this case, user A may not publish presence information manually. Another example: general manager of a company is going to hold a meeting and asks his secretary to set his status to "meeting". The secretary publishes presence information of the general manager by using some software. Obviously, the user's experience is greatly enhanced through delegation.

Inventor found that in prior arts, however, the publisher of presence information must be the presentity client of the presentity and the system in prior arts could not publish presence information by delegation. In this case, users cannot delegate other entities to publish their presence information. They have to log in to another program to publish presence information themselves. As a result, users have poor experience and the mechanism is not flexible enough. When user uses some services, the service presence information may be very limited because user is not familiar with the services and does not know the presence information of the services.

SUMMARY OF THE INVENTION

To solve the problems in prior arts, the invention provides a method and system to publish presence information through delegation, which enables presence information to be published more flexibly and may greatly enhance users' experience.

This invention provides a method for publishing presence information, including:

The delegated presentity client or application server sends a message carrying presence information to the presence server.

After judging that the message is published through delegation, the presence server processes the message according to the delegation authorization rules.

After judging that the message is not published though delegation, the presence server processes the message in the non-delegation publication mode.

After the above message is processed, the presence server sends presence information to the watcher that subscribes to the presence information.

The delegation authorization rules further comprise the delegation publication authorization rules, and the presence server determines the delegation mode in which the message is processed according to the delegation publication authorization rules.

The delegation authorization rules further comprise the delegation content authorization rules. The delegation content authorization rules comprises the personal delegation authorization rules, universal delegation authorization rules, default rules or a combination of the rules.

The delegation authorization rules further comprise the delegation filter rules. The presence server filters presence information by the delegation filter rules.

The presence server checks that the presence information is published through delegation, which further includes:

When a user ID of the publisher is not the same as that of owner of the presence information, the presence server determines that the presence information is published through delegation;

Or when a section indicating delegation in the message is set, the presence server determines that the presence information is published through delegation.

The presence server processes the message according to the delegation authorization rules, which further includes: the presence server checks whether to wait for confirmation of the presence information by the owner of the presence information.

The presence server processes the message according to the delegation authorization rules, which further includes: the presence server checks whether to reject the message. If yes, the presence server will reject publishing the presence information.

The delegation publication authorization rules further includes the validity period, cycle and/or times. When publishing presence information is within the preset validity period, cycle and/or times, the presence server allows publishing the presence information.

In addition, the invention provides a system for publishing presence information that includes the presentity client, presence server, XDMS, and delegated presentity client or application server.

The delegated presentity client or application server sends a message carrying presence information to the presence server.

The presence server processes the message according to the delegation authorization rules if the message is published through delegation, or processes the message in the non-delegation publication mode if the message is not published through delegation. After the message is processed, the presence server sends the presence information to the watcher that subscribes to the presence information. The delegation authorization rules are set by the presentity on the presence server or in the XDMS.

The presence server further comprises the presence information composing and publishing unit and delegation checking and processing unit.

The delegation checking and processing unit is configured to check whether a message is published through delegation. If yes, the unit processes the message according to delegation authorization rules and sends presence information to the presence information composing and publishing unit; if not, the unit directly sends the presence information to the presence information composing and publishing unit.

The presence information composing and publishing unit is configured to process the presence information according to preset rules and publish to the watcher.

The delegation checking and processing unit is configured to filter presence information according to the delegation filter rules and send the presence information to the presence information composing and publishing unit. The delegation filter rules are set by the presentity client in the XDMS.

The delegation checking and processing unit is configured to wait for confirmation if confirmation is required, and to send the message to the presence information composing and publishing unit upon confirmation.

The delegation checking and processing unit is configured to reject publishing presence information when the message needs to be rejected.

The delegation checking and processing unit is configured to send presence information to the presence information composing and publishing unit when the message is within the preset validity period, cycle and/or times.

The presence server further comprises:

Delegation publication authorization processing unit, configured to receive messages and to send presence information that are published through delegation and permitted to be published to the presence information composing and publishing unit;

Presence information composing and publishing unit, configured to process the presence information according to preset rules and output it to the watcher after receiving presence information sent by the delegation publication authorization processing unit.

The delegation publication authorization processing unit is also configured to wait for confirmation, if confirmation by the owner of the presence information is required, and to send the message to the presence information composing and publishing unit upon confirmation.

The delegation publication authorization processing unit is also configured to reject publishing the message when the message needs to be rejected.

The presence information composing and publishing unit is also configured to filter presence information according to the delegation filter rules and output the presence information that is permitted to be published. The delegation filter rules stores in the XDMS or in the presence server.

In addition to the above method and system for publishing presence information, the invention provides a presence server, including the presence information composing and publishing unit and the following:

Delegation checking and processing unit, configured to check whether a message carrying presence information is published by delegation. If yes, the unit processes the message according to delegation authorization rules and sends the presence information to the presence information composing and publishing unit; if not, the unit directly sends the presence information to the presence information composing and publishing unit.

The delegation checking and processing unit is also configured to filter presence information according to the delegation filter rules and send the presence information to the presence information composing and publishing unit.

The delegation checking and processing unit is also configured to wait for confirmation by the owner of the presence information if confirmation is required, and to send the message to the presence information composing and publishing unit upon confirmation.

The delegation checking and processing unit is also configured to reject publishing the presence information when the message needs to be rejected.

The delegation checking and processing unit is also configured to send a message to the presence information composing and publishing unit when the message is within the preset validity period, cycle and/or times.

This invention also provides another presence server, including the presence information composing and publishing unit and the following:

Delegation publication authorization processing unit, configured to receive a messages carrying presence information and send the messages that are published in the delegation mode and permitted to be published to the presence information composing and publishing unit.

The delegation publication authorization processing unit is also configured to wait for confirmation by the owner of the presence information if confirmation is required, and send the message to the presence information composing and publishing unit upon confirmation.

The delegation publication authorization processing unit is also configured to reject publishing a message when the message needs to be rejected.

The presence information composing and publishing unit is also configured to filter presence information according to the delegation filter rules and output the presence information that is permitted to be published. The delegation filter rules stores in the XDMS or on the presence server.

In addition, the invention provides a presence information composing and publishing unit, including the presence information composing unit, presence information publishing unit, and delegated content authorization processing unit and at least one of the following units: watcher filtering unit, content authorization rules checking unit and partial notification processing unit. The presence information composing and publishing unit is configured to process presence information according to the delegation content authorization rules and output information that is permitted to be published through delegation. The messages output by the presence information composing unit are processed by the delegation content authorization processing unit and at least one of the watcher filtering unit, content authorization rules checking unit and partial notification processing unit and then output to the presence information publishing unit.

The presence information composing and publishing unit further comprises the delegation filter processing unit that is configured to filter presence information according to the delegation filter rules and output the contents to be published after the contents are filtered. Messages output by the presence information composing unit are processed by the delegation content authorization processing unit, the delegation filter processing unit, and at least one of the watcher filtering unit, authorization rules checking unit and partial notification processing unit, and then output to the presence information publishing unit.

The above technical mechanism helps user to delegate other user or other application servers to publish presence information on behalf of the user. It enables the user to publish presence information during use of applications without logging in to a specific terminal used to publish the presence information of the user. This makes publication of presence information more flexible, reduces manual publication and enhances user' experience. User should not know much about some services or remember complicated presence information. The service may provide user with a man-machine interface to display presence information for user to choose from, which makes it easier to publish and configure presence information and is significant to service deployment. In addition, service contents according to presence information are more abundant and may attract more user to use services related to presence information.

DETAILED DESCRIPTION OF THE INVENTION

The invention will now be described in detail hereinafter in conjunction with the embodiments and the drawings of the invention.

Embodiment 1

Figure 4:
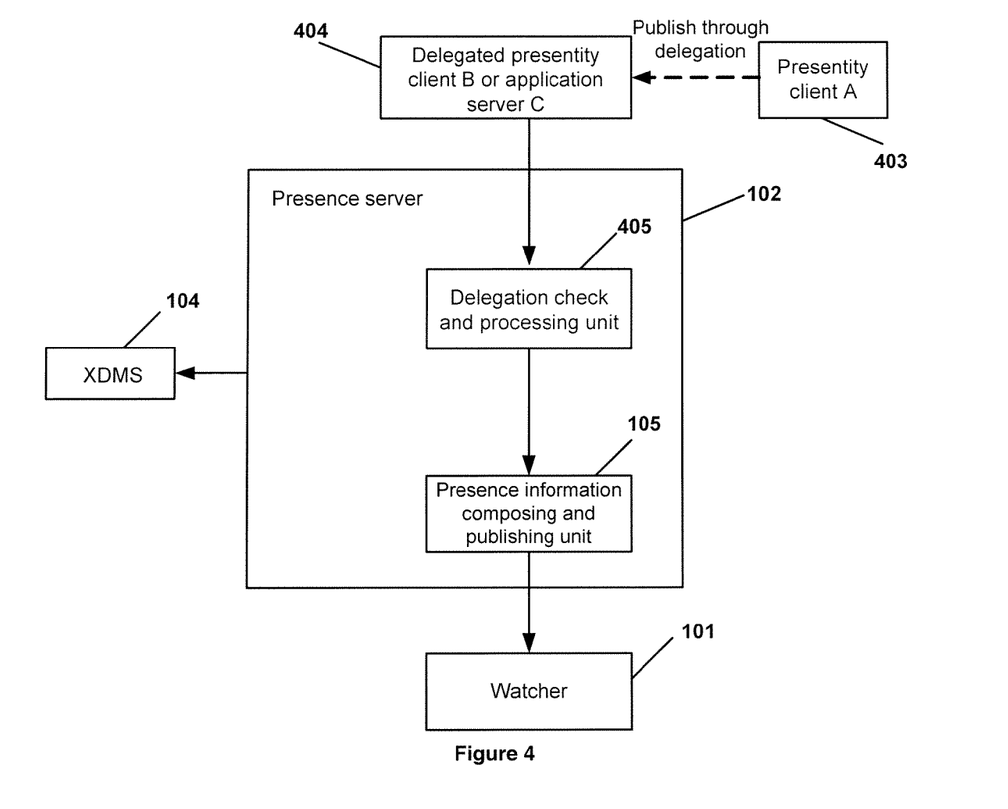
FIG. 4 is a schematic diagram of a system for presenting service according to an embodiment of the invention.
Figure 5:
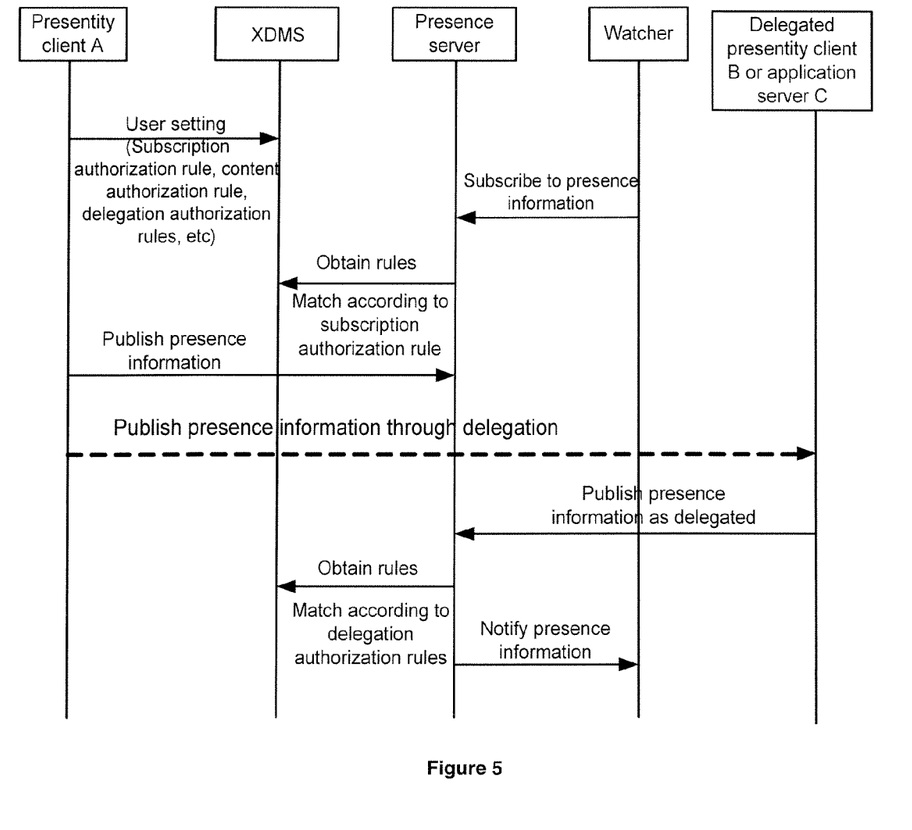
FIG. 5 is a flow chart illustrating a subscribing and publishing method according to an embodiment of the invention.

FIG. 4 is a schematic diagram of a system for presenting service according to an embodiment of the invention. As shown in FIG. 4, the system comprises a presentity client A (403), a delegated presentity client B or an application server C (404), a presence server (102), a watcher client (101) and an XDMS (104). The presence server (102) includes a delegation checking and processing unit (405) and a presence information composing and publishing unit (105). As shown in FIG. 5, a subscribing and publishing method according to an embodiment of the invention is as follows:

1) the Presentity client A (403) presets some rules in the XDMS (104), such as subscription authorization rules permitting whom to subscribe to information, content authorization rules permitting publishing which information, and delegation authorization rules determining whether permitting delegation or permitting to delegate which content.

2) The watcher client (101) sends a subscription request to the presence server (102) to subscribe to presence information of presentity client A.

3) The presence server (102) matches the subscription request with the subscription authorization rules. If the subscription request satisfies the subscription authorization rules, the presence server permits subscription, sends the subscription information to the XDMS (104) and saves subscription relationship of the watcher client and the presentity client A.

4) the Presentity client A (403) delegates presentity client B or application server C (404) to publish presence information of the presence A to the presence server (102). For example, a general manager delegates the secretary, a user uses a service (for example, log in to the game sever) or clicks a button to trigger the delegating publication flow.

5) The presentity client B or the application server C (404) publishes the presence information of the presence A to the delegation checking and processing unit (405) of the presence server (102). The delegation checking and processing unit (405) operates as follows:

a) The delegation checking and processing unit (405) checks whether the presence information published by the presentity client B or the application server C is published by delegation.

b) If the presence information is not published by delegation, perform process f; if the presence information is published by delegation, perform process c.

c) The delegation checking and processing unit checks whether publication by the presentity client B or the application server C is permitted according to the delegation publication authorization rules.

d) The delegation checking and processing unit checks which contents that are permitted to be published according to the delegation content authorization rules.

e) The delegation checking and processing unit filters contents and rejects the contents that do not meet conditions according to the delegation filter rules.

f) The delegation checking and processing unit sends presence information meeting conditions according to the delegation filter rules to the presence information composing and publishing unit.

Figure 6:
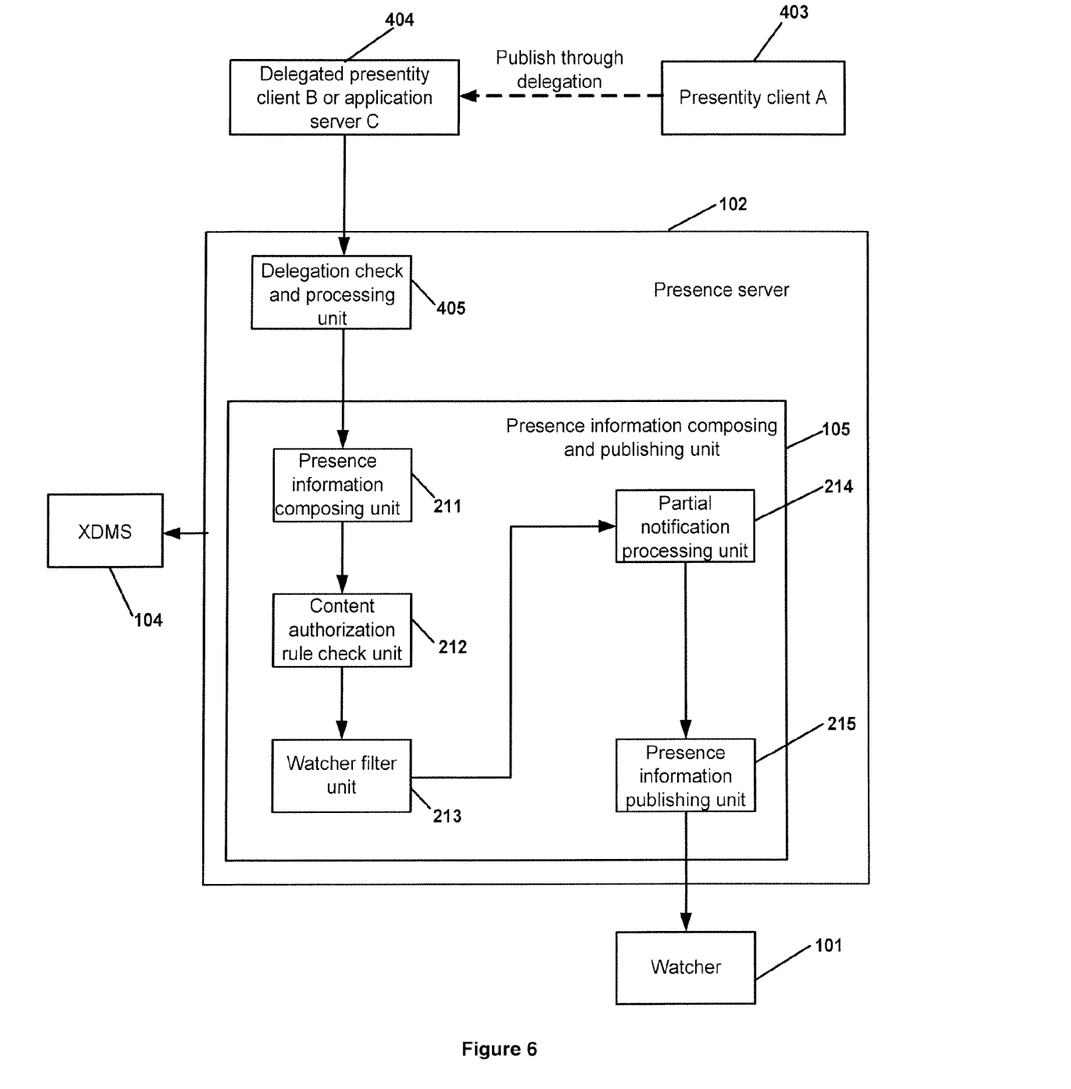
FIG. 6 is a detailed schematic diagram of a system for presenting service according to an embodiment of the invention.

6) The presence information composing and publishing unit (105) may use prior functional units for information processing. As shown in FIG. 6, the prior functional units of composing and publishing unit (105) includes a presence information composing unit (211), a content authorization rules checking unit (212), a watcher filtering unit (213), a partial notification processing unit (214) and a presence information publishing unit (215).

7) The presence information composing and publishing unit (105) sends a NOTIFY message to the watcher client (101).

In the embodiment, the functions of the delegation checking and processing unit (405) are optional.

The delegation checking and processing unit (405) obtains rules in one of the following ways:

The presence server (102) may obtains rules via XCAP, or by notification of changing of the rules from the XDMS if the presence server (102) subscribes to the notification of changing of the rules. The delegation checking and processing unit (405) also may obtain rules from the XDMS (104) via XCAP directly. A public module may be set in the presence server (102) to obtain rules from the XDMS (104) and offer the rules to other units in the presence server (102), and the rules may also be saved in the presence server (102).

A person skilled in the relevant filed of technology understands that the units or units in the invention may obtain the rules in the above ways. The delegation content authorization rules and delegation filter rules shall be applied to presence information publish at last time and presence information stored in the presence server, and then compose presence information publish at last time and presence information stored in the presence server in the embodiment.

In the embodiment, the application server includes a game server or a server with similar functions and an instant messaging server such as ICQ/MSN server. A presence user may fill in a message to be published or the user ID in the game server, and the game server automatically sends the user ID and presence information related to games to the presence server. If the presence server is not unique, the user may enter the ID of a presence server so that the presence information and the user ID may be sent to the presence server.

The embodiment describes a flow for publishing presence information by delegation. in the presence server (102), delegation may be combined with prior arts to decide how to process the presence information through the delegation checking flow. Upon receiving messages carrying presence information to be published, the delegation checking unit first checks whether the message carrying presence information to be published is published through delegation. If not, process the message carrying presence information to be published according to the prior procedure; if yes, obtain the delegation authorization rules (including delegation publication authorization rules, delegation content authorization rules, and/or delegation filter rules) from the XDMS (104) and publish the presence information in the message carrying presence information to be published by the delegation authorization rules.

The delegation checking unit checks whether message carrying presence information to be published is published through delegation in the following ways:

1. The delegation checking unit receives the publisher's user ID of the message and the user ID of the owner of presence information, and compares the user IDs. If the user IDs are the same, the message are published directly; if the user IDs are different, the messages are published through delegation.

2. A section such as Delegation may be added in a message carrying presence information (message header or message body) to be published to identify delegation. Of course, a person skilled in the relevant field of technology knows that the section may be placed anywhere in the sent information during publication as long as the presence server detects the message according to the preset protocol, for example, the section is placed in published presence information and may be of any type.

Figure 7:
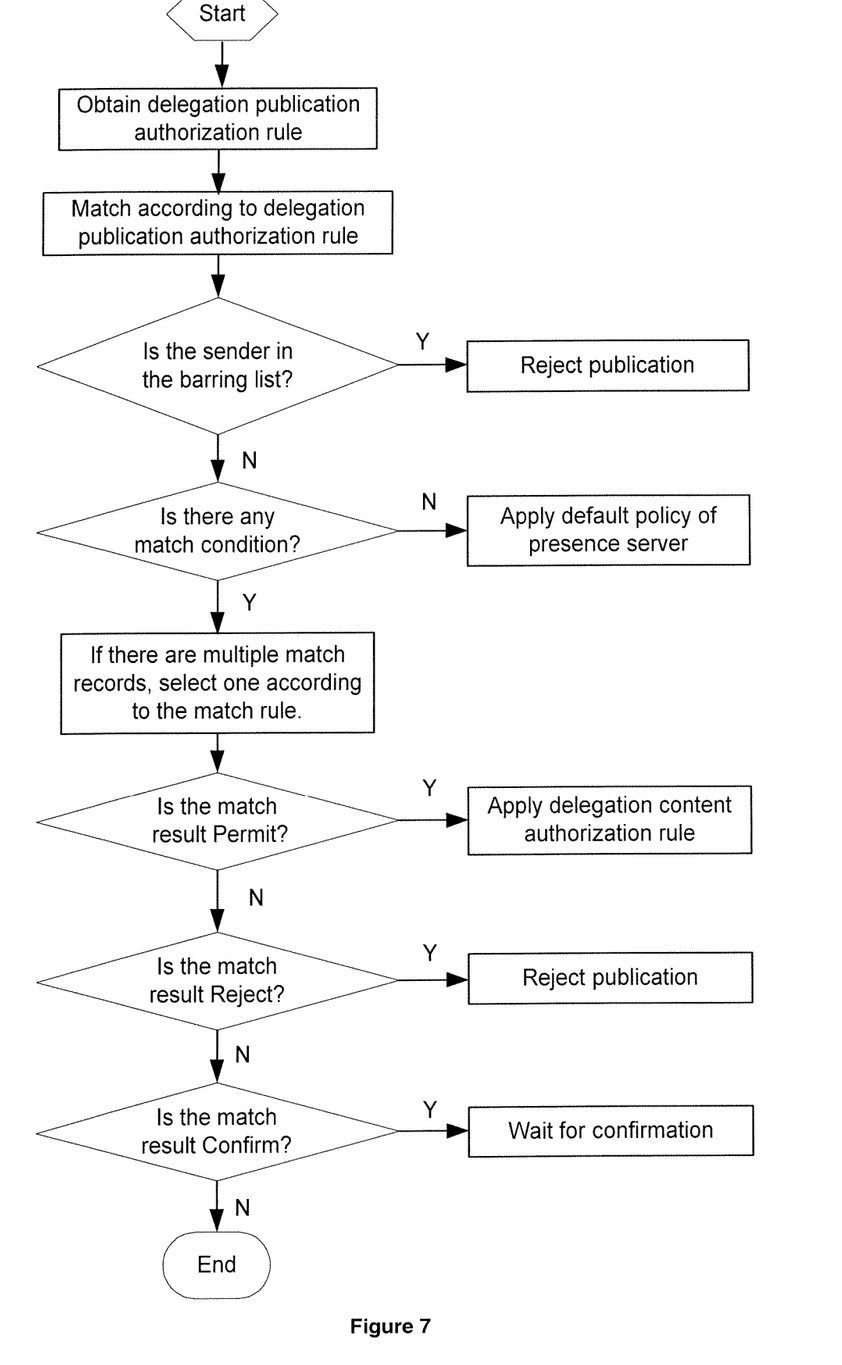
FIG. 7 is a flow chart illustrating a method for executing the delegation publication authorization rules and delegation content authorization rules according to an embodiment of the invention.

As shown in FIG. 7, a flow for executing the delegation publication authorization rules and delegation content authorization rules is described hereinafter in detail.

1) After receiving a message carrying presence information to be published, the delegation checking and processing unit (405) obtains the delegation publication authorization rules from the XDMS (104) and matches the message carrying presence information to be published with the delegation publication authorization rules.

2) The delegation checking and processing unit checks whether the publisher of the message carrying presence information to be published matches any item in the barring list. If yes, reject publication, otherwise, perform process 3.

3) The delegation checking and processing unit checks whether the publisher of the message has match items in the delegation publication authorization rules. If not, apply default policy (e.g. rejects or publishes all messages) of the presence server; if yes, perform process 4.

4) The delegation checking and processing unit checks whether the message carrying presence information matches multiple items of the delegation publication authorization rules. If yes, select an item as first match item according to selection rules such as priority.

5) the delegation checking and processing unit searches for a result in the delegation publication authorization rules corresponding to the first match item. If the result is not Permit, perform process 6. If the result is Permit, the delegation checking and processing unit matches the first match item with the delegation content authorization rules again to get second match item and searches for relevant processing rules (personal delegation content authorization rules or universal delegation content authorization rules) according to the second match item to process the message.

6) If the result is Reject, the unit rejects publishing the message.

7) If the result is Confirm, the unit executes confirmation procedure. The delegating party, i.e. the owner of presence information, may select the delegation content authorization rules such as universal delegation authorization rules or personal delegation authorization rules, or select contents that may be published, or reject publication.

All the rules may be set flexibly according to personal requirements. The above rules are used to match message sections or IDs related to the rules.

It is easy for a person skilled in the relevant field of technology to implement the flows and setting of rules disclosed in the embodiments according to prior programming means.

The following gives some examples of specific delegation publication authorization rules and delegation content authorization rules. First, match the message carrying presence information with the delegation publication authorization rules, including searching the barring list and match record table. The match record table includes personal ID (matching with a specific personal ID) match and universal ID (an identifier with common features may be used to match, for example, *@163.com) match. Relevant processing is performed according to the search result. If no matched ID is found, the presence server will apply default policy. If a matched ID is found in the barring list, publication will be rejected. If the search result is Reject, publication will be rejected. If the search result is Permit, match relevant ID of the search result in the delegation content authorization rules and processed according to the relevant delegation content authorization rules. If the search result is Confirm, wait for confirmation. The delegation content authorization rules includes personal delegation content authorization rules and universal delegation content authorization rules. The personal delegation content authorization rules corresponds to personal ID and the universal delegation content authorization rules corresponds to universal ID. Among the rules, information publication contents or publication scope may be set in compliance with the rules. In the following example, suppose the presentity client is user Li Si, and the rule files of the user are as follows:

1. Barring list: liming@163.com chen@163.com

2. Match record table

| Delegated user ID | Result | Priority |
| --- | --- | --- |
| zhangsan@163.com | Permit | 1 |
| *@163.com | Reject | 2 |
| chenrui@163.com | Permit | 1 |
| macy@future.com | Confirm | 1 |

3. Delegation content authorization rules:

| Delegated user ID | Location nformation | Game information |
|---|---|---|
| zhangsan@163.com | Reject | Permit |
| *@163.com | Permit | Reject |

According to the barring list, the publication authorization rules and the content authorization rules, the following gives some examples for users to publish information:

1. The delegated user with id of liming@163.com helps user Li Si to publish information, the publication will be rejected as liming@ 163.com is in the barring list.
2. The delegated user with id of zhangsan@163.com helps user Li Si to publish information, both the personal delegation authorization rules and universal delegation authorization rules are in the publication authorization rules, and the personal delegation authorization rules has higher priority, with the match result of Permit. Match the personal ID zhangsan@163.com in the content authorization rules, and the match result is apply delegation authorization rules of zhangsan@163.com, so the game information is permitted to be published. Precise match is used above. If the user ID zhangsan@163.com does not exist in the delegation content authorization rules, use the rules related to *@163.com for processing, that is, only location information is permitted to be published.
3. The delegated user with id of tianlinyi@163.com helps user Li Si to publish information, the publication will be rejected because the match result is universal ID and the result in the corresponding rule is Reject.
4. The delegated user with id of chenrui@163.com helps user Li Si to publish information, the personal ID chenrui@163.com will be matched in delegation content authorization rules as the match ID is personal ID, and the result in the corresponding rule is Permit. The match result is *@163.com, and the corresponding rule is that publication of location information is permitted.
5. The delegated user with id of luojun@future.com helps user Li Si to publish information, the match result may be Reject or Confirm according to the default policy of the presence server because there is no matched ID in the delegation publication authorization rules including barring list and match record table.
6. The delegated user with id of macy@future.com helps user Li Si to publish information, the publication will be confirmed as the result in the rules corresponding to the matched ID is Confirm.

The publication period and times may be specified in the delegation publication authorization rules. For example, the validity period may be set to 8:00 to 18:00 every day and the times may be set to 100. If the times is set to 100, after the 100th time subscription will be invalid, publication is not permitted and subscription must be renewed.

The following describes the presentity client in the embodiments and corresponding flow.

The presentity client in the embodiments comprises a delegation publication processing module, and operates flows as follows:

1) The presentity client enquires the presence information publishing entity whether to publish information through delegation.
2) If information is published through delegation, messages to be published indicates delegation, for example, adding the Delegation section in the message header.
3) If information is published through delegation, the presentity client may publish the user ID of the publisher and that of the owner of presence information instead of adding the section. The presence server judges according to the user IDs. The presentity client may also add a section indicating non-delegation.

Figure 8:
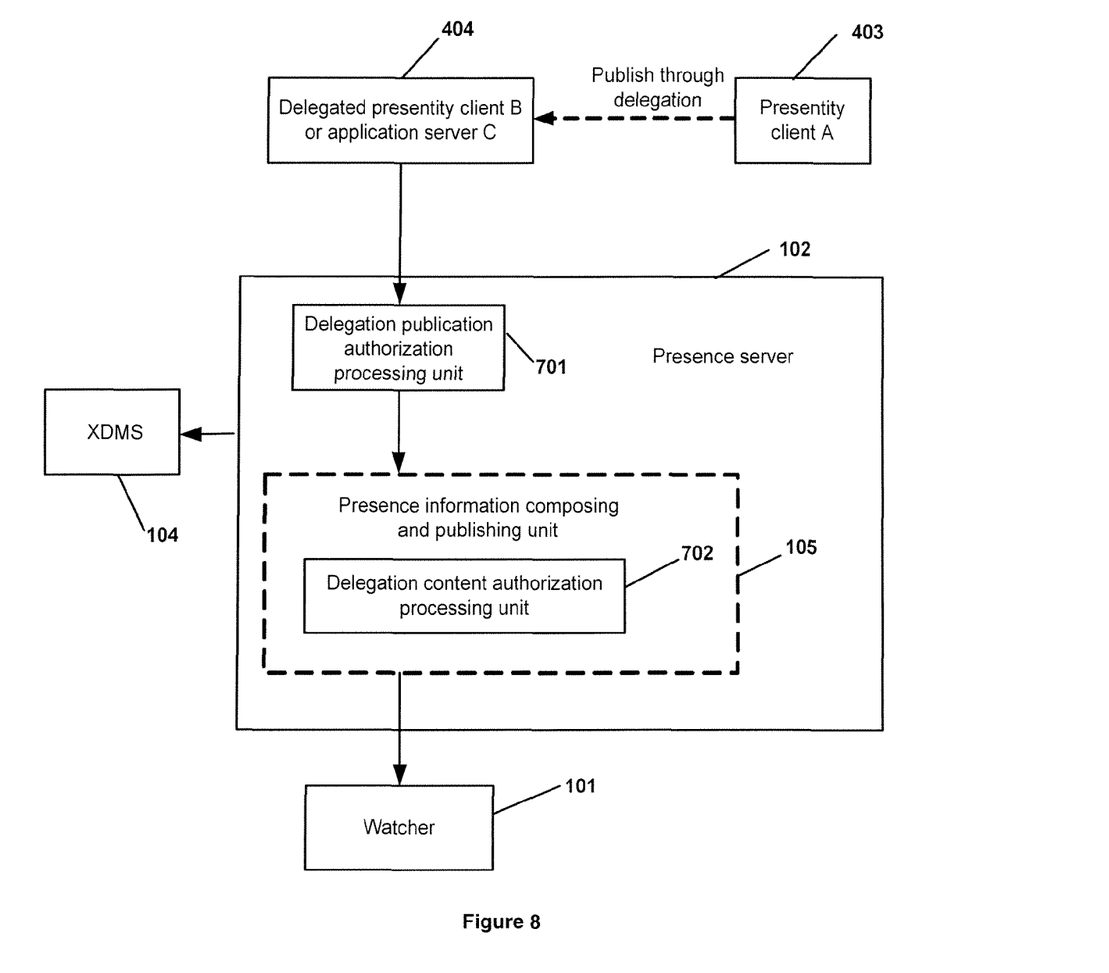
FIG. 8 is a schematic diagram of a system for presenting service according to an embodiment of the invention.
Figure 9:
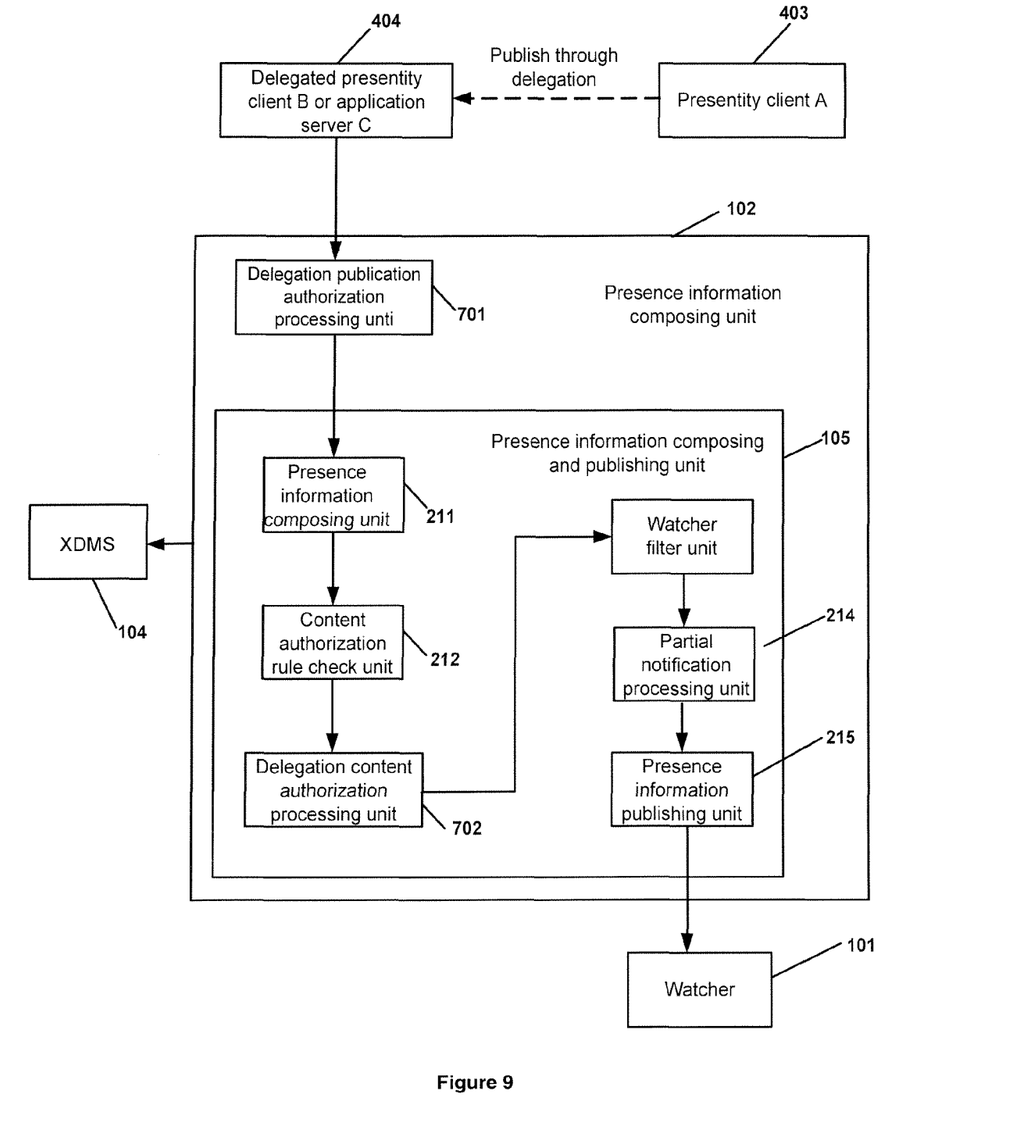
FIG. 9 is a detailed schematic diagram of a system for presenting service according to an embodiment of the invention.

Another Embodiment of the Invention:

As shown in FIG. 8, the system in this embodiment comprises presentity client A (403), delegated presentity client B or application server C (404), presence server (102), watcher (101) and XDMS (104). The presence server (102) further comprises delegation publication authorization processing unit (701) and presence information composing and publishing unit (105) comprising a delegation content authorization processing unit (702). As shown in FIG. 9, the delegation content authorization processing unit (702) is located between the content authorization rules checking unit (212) and the watcher filtering unit (213) in the presence information composing and publishing unit (105). A person skilled in relevant filed of technology shall understand that the delegation content authorization processing unit (702) is not restricted to the location specified in this embodiment. It may be located anywhere between the presence information composing unit (211) and the presence information publishing unit (215). The subscription and publication flow in the embodiment is as follows:

1) Presentity client A (403) presets some rules in the XDMS (104), such as the subscription authorization rules indicating permitting whom to subscribe to information, content authorization rules indicating permitting publishing which information, and delegation authorization rules.
2) The watcher client (101) sends a subscription request to the presence server (102) to subscribe to presence information of presentity client A.
3) The presence server (102) matches the subscription request with the subscription authorization rules. If the subscription request satisfy the subscription authorization rules, the presence server permits subscription and saves the subscription relationship of the watcher client and the presentity client A.
4) The presentity client A (403) delegates presentity client B or application server C (404) to publishes presence information to the presence server (102).
5) The presentity client B or application server C (404) publishes the presence information of the presence A to the delegation publication authorization processing unit (701) of the presence server (102), and the delegation publication authorization processing unit (701) operates as follows:
    a) The unit (701) checks whether the presence information is published by delegation.
    b) If the presence information is not published by delegation, perform process d; if the presence information is published by delegation, perform process c.
    c) The unit (701) checks whether publication by delegation is permitted according to the delegation publication authorization rules in the XDMS (104).
    d) The unit (701) sends the presence information to the presence information composing and publishing unit (105).
6) Units in the presence information composing and publishing unit (105) operate as follows:

The presence information composing unit (211) composes presence information published at last time and presence information stored in the presence server presence information and presence information saved on the server.

The content authorization rules checking unit (212) rejects the presence information, composed by the presence information composing unit, that is not permitted to be published according to the rules set by the presentity client.

The delegation content authorization processing unit (702) judges contents of the presence information composed, by the presence information composing unit, the contents are permitted to be published according to the delegation content authorization rules.

The watcher filtering unit (213) rejects the presence information that is not expected to be received according to the rules set by the watcher client, for example, the watcher client only wishes to be informed when a user is online and expects to reject other presence information.

The partial notification processing unit (214) rejects information that is not within the scope of subscription according to the rules set by the watcher (101) during subscription, for example, the watcher client only wishes to receive presence information indicating the location of the user.

The presence information publishing unit (215) notifies the watcher client (101) of the presence information processed by the presence information composing and publishing unit.

7) The presence information publishing unit (215) sends a NOTIFY message to the watcher client (101).

In an improvement of the embodiment, the presence information composing and publishing unit (105) may further comprise a delegation filter processing unit only publishing contents that meet delegation filter conditions.

A person skilled in relevant field of technology shall understand that the delegation content authorization processing unit (702) in the embodiment may be located anywhere between the presence information composing unit (211) and the presence information publishing unit (215). The processing sequence in the flow may be set flexibly. The delegation content authorization processing unit and the delegation filter processing unit may be separately located anywhere between the presence information composing unit (211) and the presence information publishing unit (215). The processing sequence of the delegation content authorization processing unit and delegation filter unit may be adjusted, and combinations may be specified according to specific requirements.

The foregoing description is only preferred embodiments of the present invention and is not for use in limiting the protection scope thereof. All modifications, equivalent replacements or improvements in the scope of the present invention's spirit and principles shall be included in the protection scope of the present invention.

We claim:

1. A method for publishing presence information, comprising:

presetting, by a presentity, delegation publication authorization rules and subscription authorization rules, wherein the delegation publication authorization rules comprise a delegated user ID permitted by the presentity to publish the presentity's presence information, and the subscription authorization rules comprise a watcher user ID permitted by the presentity to subscribe to the presentity's presence information;

receiving, by a presence server, a PUBLISH message carrying the presentity's presence information and a publisher's user ID sent from a publisher;

matching the publishers user ID carried in the PUBLISH message with the delegation publication authorization rules to determine that the presentity has permitted the publisher to publish the presentity's presence information; and determining that a watcher client has been permitted to subscribe to the presentity's presence information according to the subscription authorization rules and sending the presence information to the watcher client.

2. The method of claim 1, wherein the presence server further determines what content of the presentity's presence information is permitted to publish according to delegation content authorization rules.

3. The method of claim 1, wherein the presence information is further filtered according to delegation filter rules.

4. The method of claim 1, wherein the presence server waits for the presentity's confirmation before sending the presence information to the watcher client.

5. The method of claim 1, wherein the delegation publication authorization rules further comprise a validity period, a cycle or times of publishing the presence information.

6. A presence server, comprising:

a delegation checking and processing unit, configured to receive a PUBLISH message carrying a presentity's presence information and a publisher's user ID sent from a publisher, and to match the publisher's user ID carried in the PUBLISH message with delegation publication authorization rules to determine that the presentity has permitted the publisher to publish the presentity's presence information, wherein the delegation publication authorization rules are preset by the presentity and comprise a delegated user ID permitted by the presentity to publish the presentity's presence information; and a presence information composing and publishing unit, configured to determine that a watcher client has been permitted to subscribe to the presentity's presence information according to subscription authorization rules and to send the presence information to the watcher client.

7. The presence server of claim 6, wherein the delegation checking and processing unit is further configured to filter presence information according to delegation filter rules.

8. The presence server of claim 6, wherein the delegation checking and processing unit is further configured to determine what content of the presentity's presence information is permitted to publish according to delegation content authorization rules.

* * * * *